(12) United States Patent
Carremm et al.

(10) Patent No.: US 9,745,932 B2
(45) Date of Patent: Aug. 29, 2017

(54) FLEXIBLE AND STRESS COMPENSATING FUEL LINE CONNECTOR

(71) Applicant: Ford Global Technologies, LLC, Dearborn, MI (US)

(72) Inventors: Swadad A. Carremm, Canton, MI (US); Mahmoud Yousef Ghannam, Canton, MI (US); Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 35 days.

(21) Appl. No.: 14/855,736

(22) Filed: Sep. 16, 2015

(65) Prior Publication Data

US 2017/0074440 A1 Mar. 16, 2017

(51) Int. Cl.
| | | |
|---|---|---|
| *F16L 27/00* | (2006.01) | |
| *F02M 55/00* | (2006.01) | |
| *F16L 27/08* | (2006.01) | |
| *F16L 37/23* | (2006.01) | |

(52) U.S. Cl.
CPC ......... *F02M 55/00* (2013.01); *F16L 27/0828* (2013.01); *F16L 27/0841* (2013.01); *F16L 37/23* (2013.01)

(58) Field of Classification Search
USPC ................. 285/316, 317, 276, 277
See application file for complete search history.

(56) References Cited

U.S. PATENT DOCUMENTS

| | | | | | |
|---|---|---|---|---|---|
| 2,461,699 | A | * | 2/1949 | Scheiwer | F16L 37/23 285/276 |
| 2,467,100 | A | * | 4/1949 | Spooner | F16L 37/23 285/277 |
| 2,521,701 | A | * | 9/1950 | Earle | F16L 37/23 285/277 |
| 2,730,382 | A | * | 1/1956 | De Mastri | F16L 37/23 251/149.6 |
| 3,074,670 | A | * | 1/1963 | Breuning | F16L 37/23 137/614.03 |
| 3,076,671 | A | * | 2/1963 | Freeman | F16L 37/23 137/614.04 |
| 3,097,867 | A | * | 7/1963 | Saloum | F16L 37/23 137/614.03 |
| 3,422,390 | A | * | 1/1969 | Tucker | H01R 13/6276 285/277 |
| 4,758,455 | A | | 7/1988 | Campbell et al. | |
| 5,628,532 | A | | 5/1997 | Ashcraft | |
| 6,899,131 | B1 | | 5/2005 | Carmack et al. | |
| 7,681,586 | B2 | | 3/2010 | Ingram | |
| 8,191,932 | B2 | * | 6/2012 | Davis | F16L 37/23 137/614.05 |

(Continued)

*Primary Examiner* — Aaron Dunwoody
(74) *Attorney, Agent, or Firm* — James Dottavio; McCoy Russell LLP (57) ABSTRACT

Systems and designs are provided for a flexible connector to be used in fuel and hydraulic lines that can withstand a high level of internal and external stress. In one example, the connector consists of three separate components, an upper, a lower and a middle portion. Spherical bearings and compression springs are used o couple the three portions together. Spherical bearings provide the ability of the connector to rotate about an axis, while the compression springs hold together the system.

20 Claims, 8 Drawing Sheets

(56) References Cited

U.S. PATENT DOCUMENTS

| | | | |
|---|---|---|---|
| 8,205,914 B2 * | 6/2012 | Chappaz | F16L 37/23 |
| | | | 285/276 |
| 8,402,948 B2 | 3/2013 | Straub | |
| 8,690,198 B2 * | 4/2014 | Saber | H01R 13/6276 |
| | | | 285/276 |
| 2006/0255589 A1 * | 11/2006 | Yang | F16L 37/23 |
| | | | 285/276 |
| 2009/0021007 A1 * | 1/2009 | Le Bars | F16L 37/23 |
| | | | 285/317 |
| 2013/0276923 A1 | 10/2013 | Wolff et al. | |

* cited by examiner

FLEXIBLE AND STRESS COMPENSATING FUEL LINE CONNECTOR

FIELD

The present description relates generally to the design of a connection system with flexible connectors in a fuel or other hydraulic systems of an automotive engine or vehicle.

BACKGROUND/SUMMARY

Automotive internal combustion engine fuel systems may use connectors to couple components of the fuel line. For example, connectors may be used to join fuel lines with system components such as engine fuel rails, fuel tanks, evaporative emission control canisters, etc. Likewise, connectors may be used to join lines for pumping hydraulic fluid. Fuel lines can be used to transport liquid fuel from the fuel tank to a fuel injector and to transfer fuel vapor to an evaporative emission control canister. Due to their location, such connectors may be subjected to stress, such as during installation, service repair procedures, diurnal heating/cooling, and due to impact from a vehicle crash. When fuel line connectors are subjected to external and/or internal stresses, the stress may be concentrated at the joints of the connector, leading to localized leaks in the fuel line. This can cause leakage of liquid fuel or fuel vapor which can degrade emissions.

One example fuel line connector is shown by Ingram in U.S. Pat. No. 7,681,586. Therein a double walled connector is described with three portions. The upper and lower portions are inflexible and clamp to outside components. A middle portion coupled to the upper and lower portions is flexible.

However, the inventors herein have recognized potential issues with such connectors. As one example, despite having flexibility, the connector may still have restricted rotational ability. Also, the connector of Ingram is designed for use in fuel dispenser sump connection systems, such as those used in gas stations. As a result, the connectors of Ingram may be difficult to use in tight-fit locations, such as those in fuel lines of internal combustion engines coupled in vehicles. Due to insufficient flexibility and rotatability of the connectors, external or internal stress on the fuel lines can be significant, leading to localized leakages.

The inventors herein have developed a connector configuration that may include sufficient degrees of freedom by which the issues described above may be at least partly addressed. One example of such a connector comprises: an upper and a lower portion physically coupleable to a middle portion, the lower portion comprising a plurality of springs in direct contact with the middle portion, where the middle portion comprises a plurality of spherical bearings to enable rotation between the upper and lower portions. In this way, connector systems may be designed to have flexibility and multiple degrees of freedom.

As an example, a flexible connector may be designed for use in fuel lines and hydraulic lines that can stand a high level of internal and external stress due to its ability to rotate and flex. The flexible connector consists of three separate components, an upper, a lower and a middle portion. The upper and lower portions are coupleable to the middle portion. Flexibility is provided by a plurality of spherical bearings and springs coupled to the middle and lower portions of the connector. The upper engagement portion may consist of a fitting nozzle with geometrical features designed for easy self-engagement and mating with an external part, such as a fuel line connecting to an engine, fuel tank, etc. In addition, the upper portion may be designed to prevent back sliding and detachment from other parts while maintaining internal pressure and creating an insulation pocket. For example, the upper portion may comprise a nozzle fitting with a plurality of angled cylindrical rings and ramps facing away from an extreme end of the nozzle. The upper portion may be fitted with a rubber seal to further reduce leaks. The middle portion may comprise a plurality of spherical bearings, evenly dispersed along an inner circumference, in order to improve flexibility and to enable rotation between the upper and lower portions. The top surface of the lower portion may comprise a plurality of compression springs in direct contact with the middle portion. The springs may be used to control the engagement of the three portions and hold the connector system in place during rotational movement within a defined position. The bottom part of the lower portion may comprise a twist-lock mechanism with defined openings and geometrical slots designed to align and join the connection system to a fuel system component.

In this way, by designing a three component connection system consisting of compression springs and spherical bearings, flexibility can be achieved for fuel line connectors. The spherical bearings allow the upper and lower portions to rotate with respect to one another about an axis of rotation. The flexibility to rotate within their defined positions reduces force concentration during internal and external stresses and enables the connection system to overcome such stresses without localized leakages. The geometrical features allow for prevention of leakage and improved mating with external parts. The lower portion including a twist-lock connector helps couple the connection system to a fuel system component. Such flexible connectors may also be used in hydraulic systems. The technical effect of using flexible connectors is that adverse effect and leakages caused by internal or external stresses on fuel lines can be reduced significantly. By including geometrical features, the connector may allow for self-engagement and smooth coupling with external parts. As a result of the improved flexibility and increased degree of rotation, such connectors may be used in a wide variety of fluid lines. In addition, such connectors may be compatible with different vehicle designs and may be easy to service. In this way, connector systems may be designed to be able to withstand internal and external stresses in the fuel line. In addition due to the compact nature and functionality such connectors may be used in tight locations such as fuel systems in internal combustion engines.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 1-8 are shown approximately to scale.

DETAILED DESCRIPTION

Figure 1:
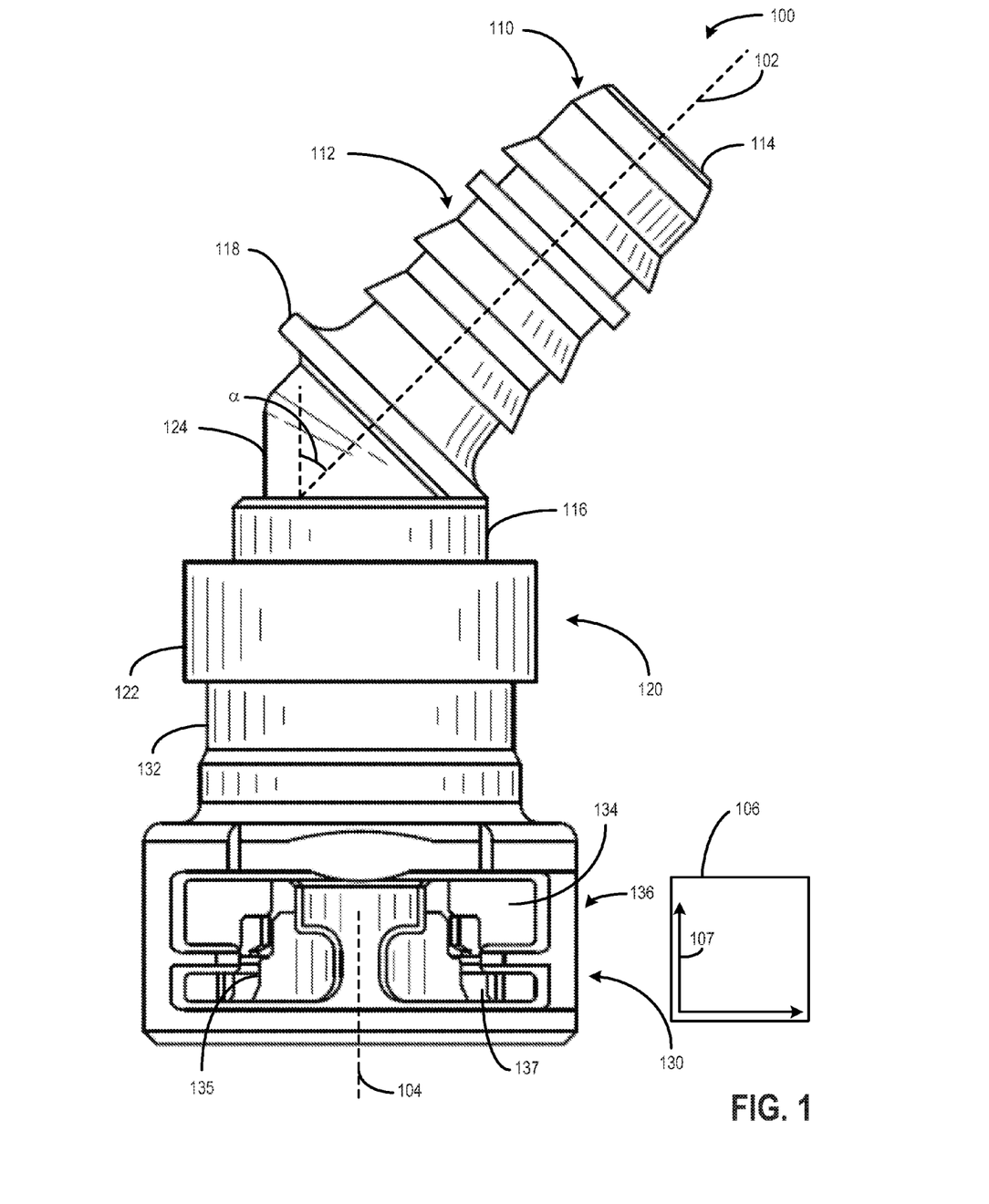
FIG. 1 is a perspective view of an example connector assembly with an upper and lower portion physically coupleable to a middle portion.
Figure 2:
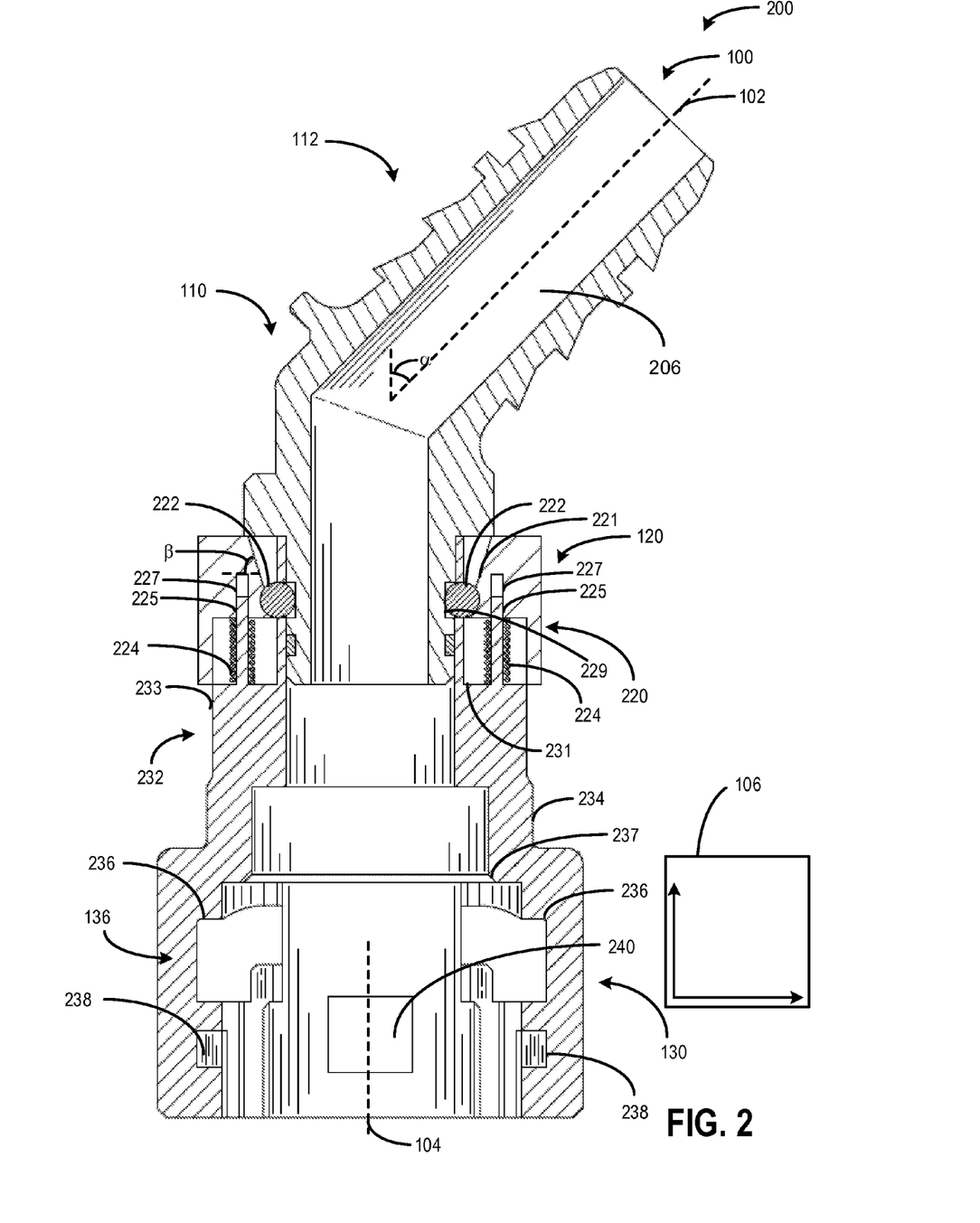
FIG. 2 is a cross-sectional view of the connector assembly.
Figure 3:
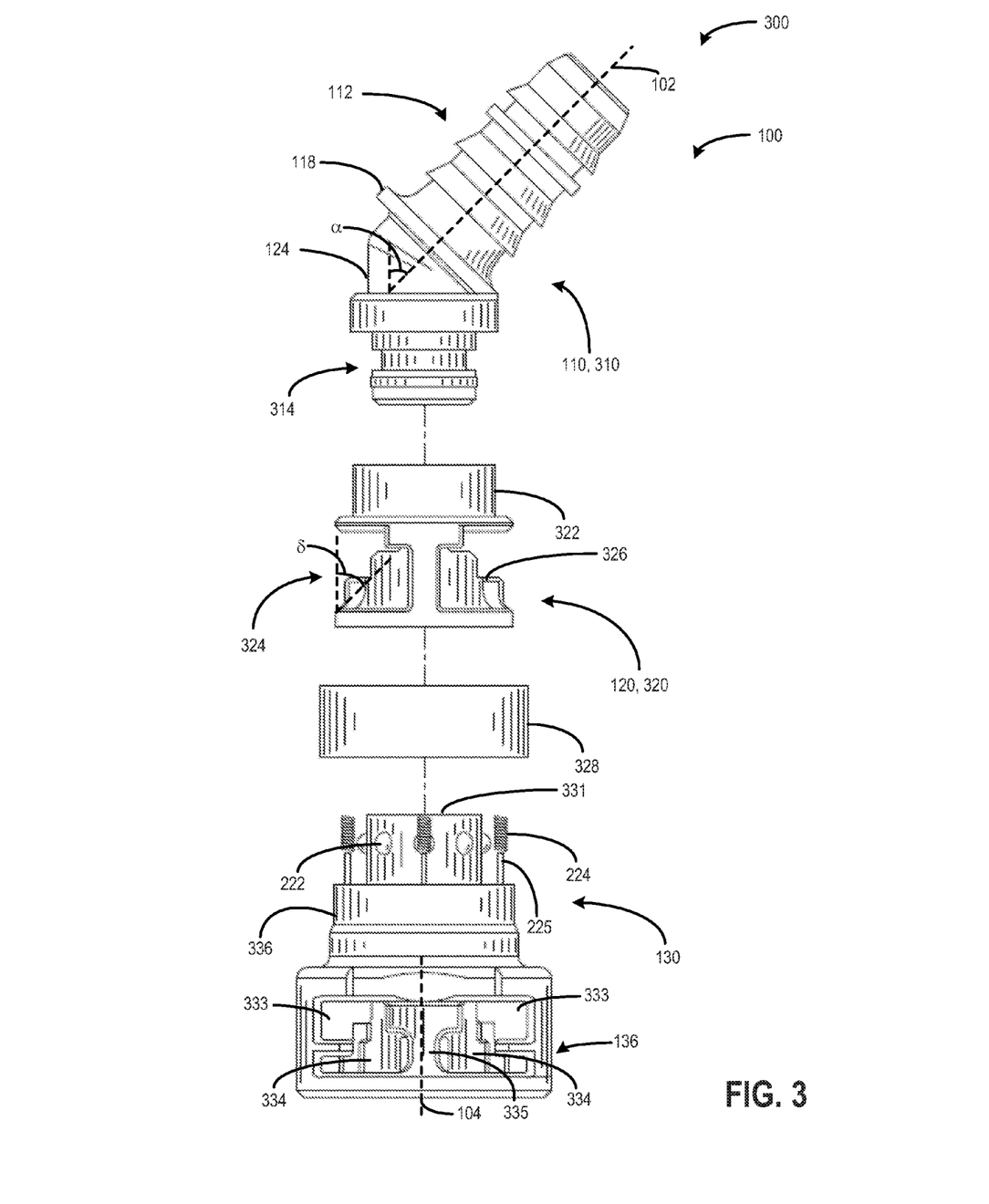
FIG. 3 is a perspective view of the disassembled components of the connector assembly.
Figure 4:
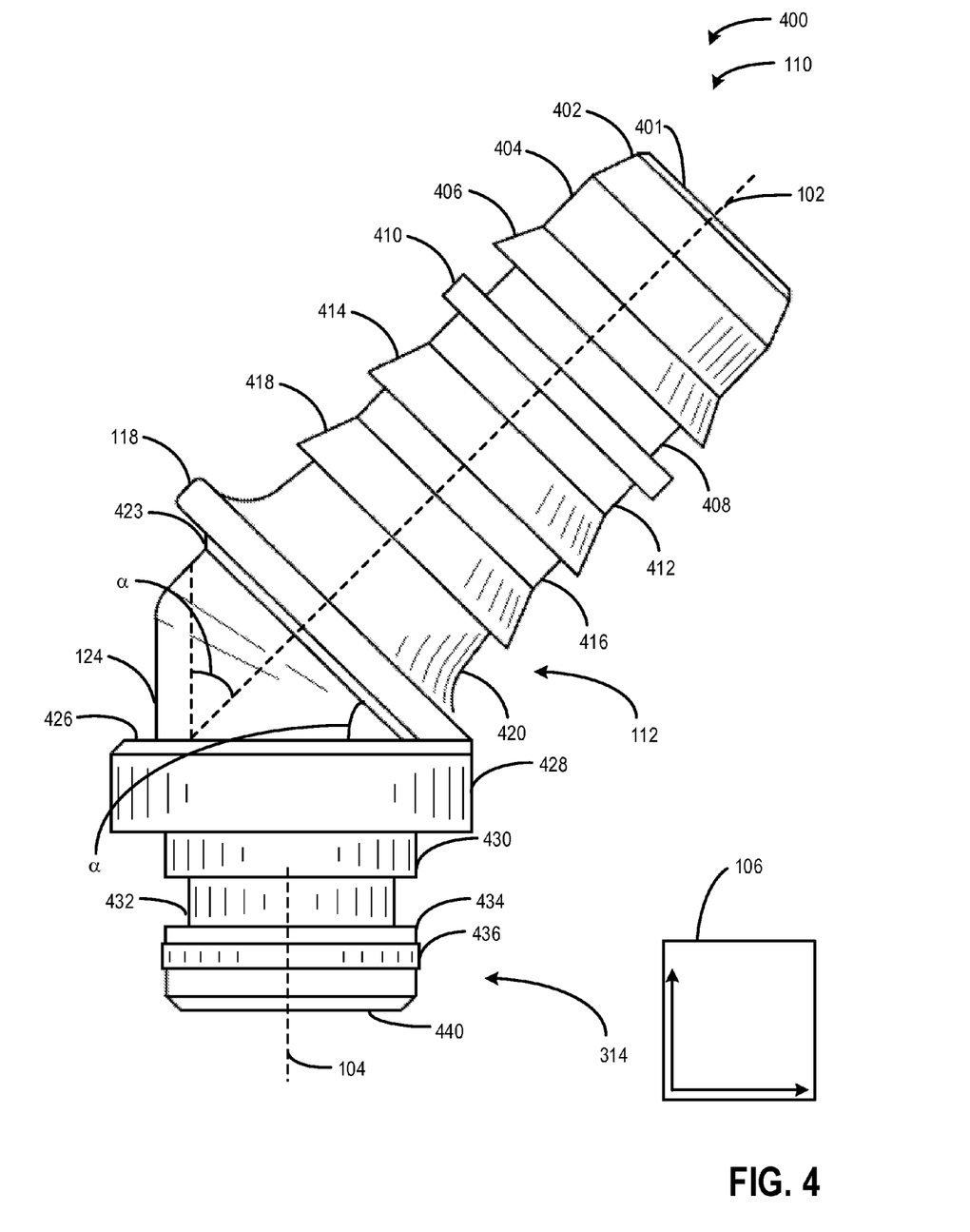
FIG. 4 is a perspective view of an upper engagement part of the connector assembly with nozzle fitting.
Figure 5:
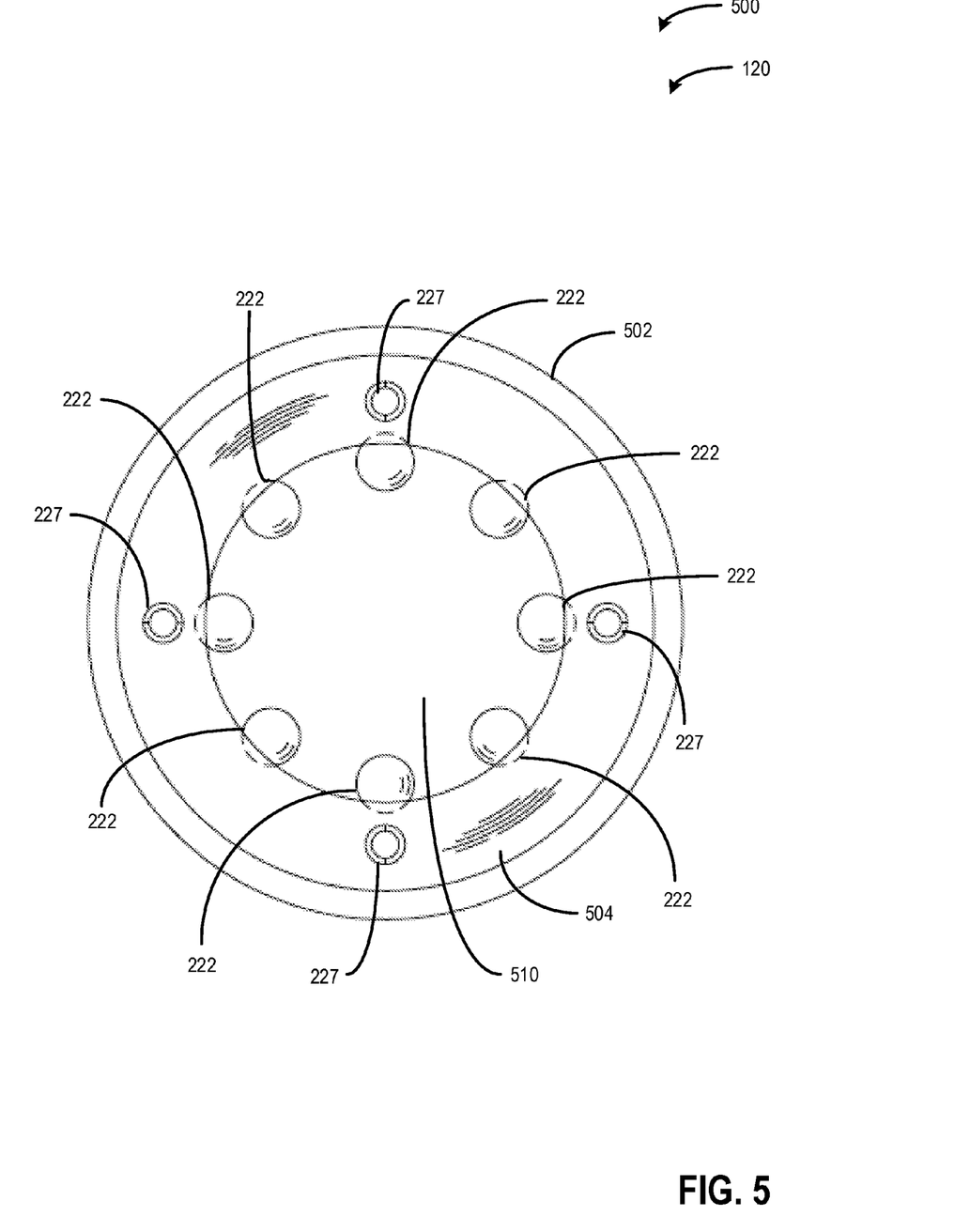
FIG. 5 is a top view of a middle locking mechanism of the connector assembly.
Figure 6:
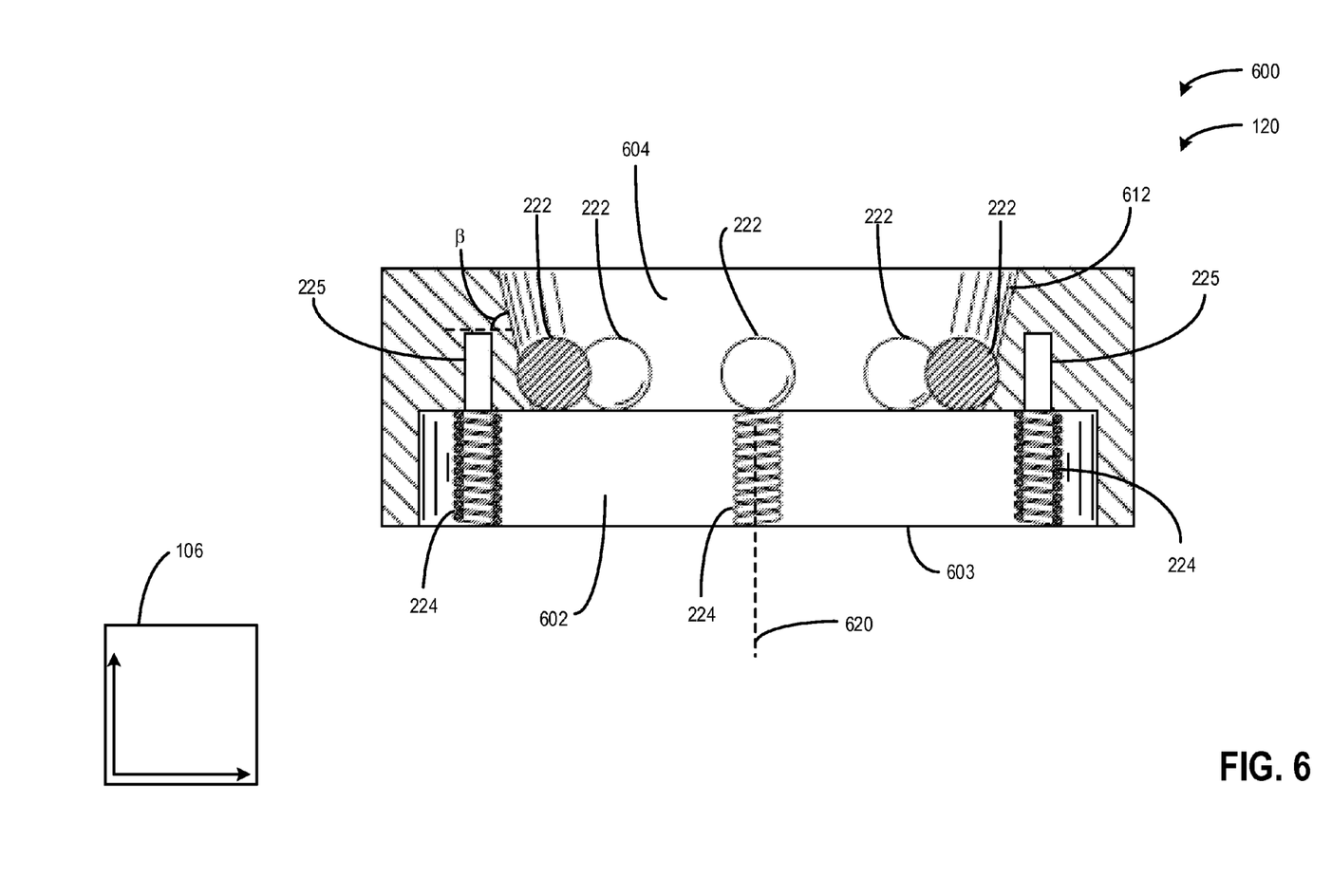
FIG. 6 is a cross-sectional view of the middle locking mechanism.
Figure 7:
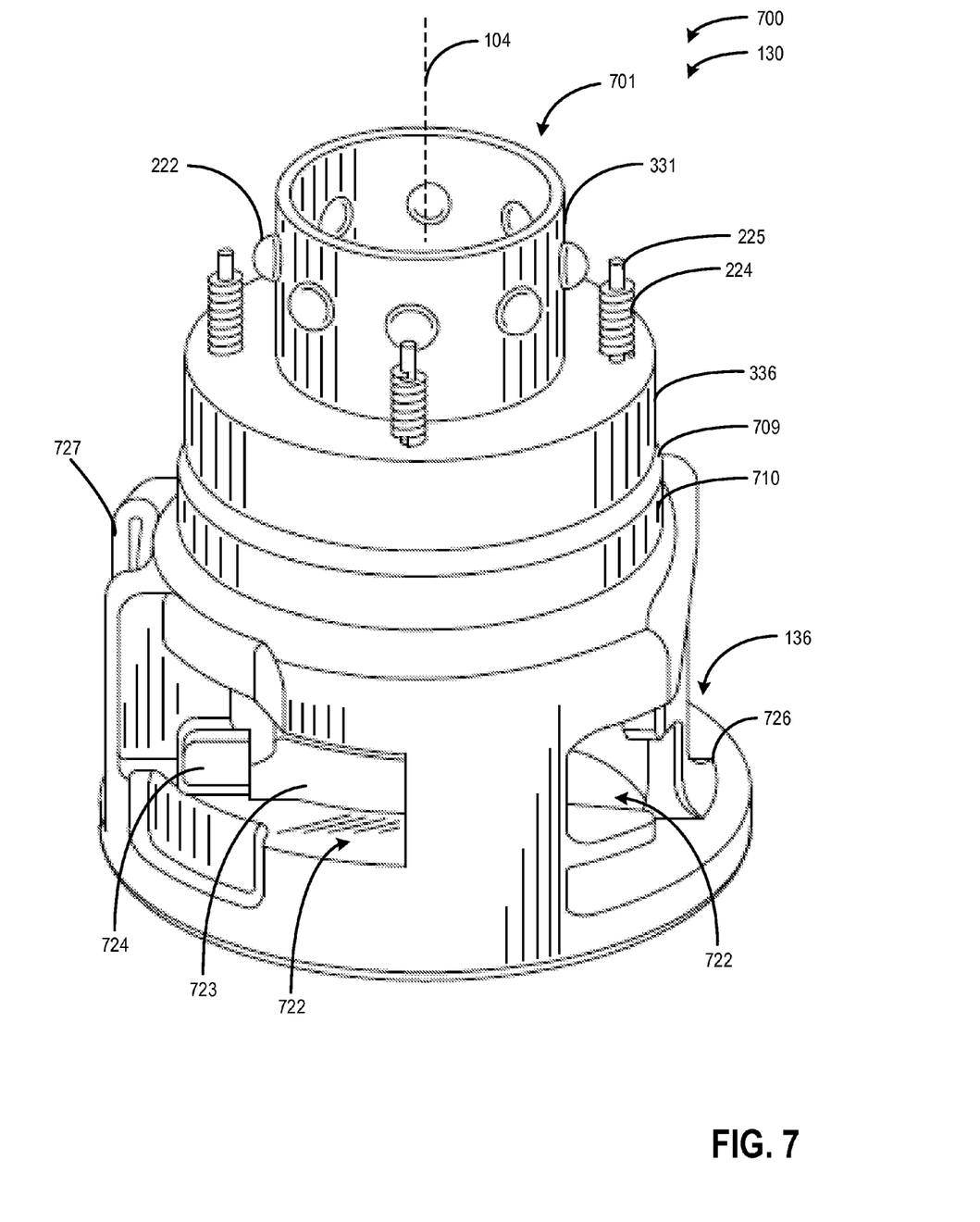
FIG. 7 is a perspective view of a lower engagement part of the connector assembly with a fitting port.
Figure 8:
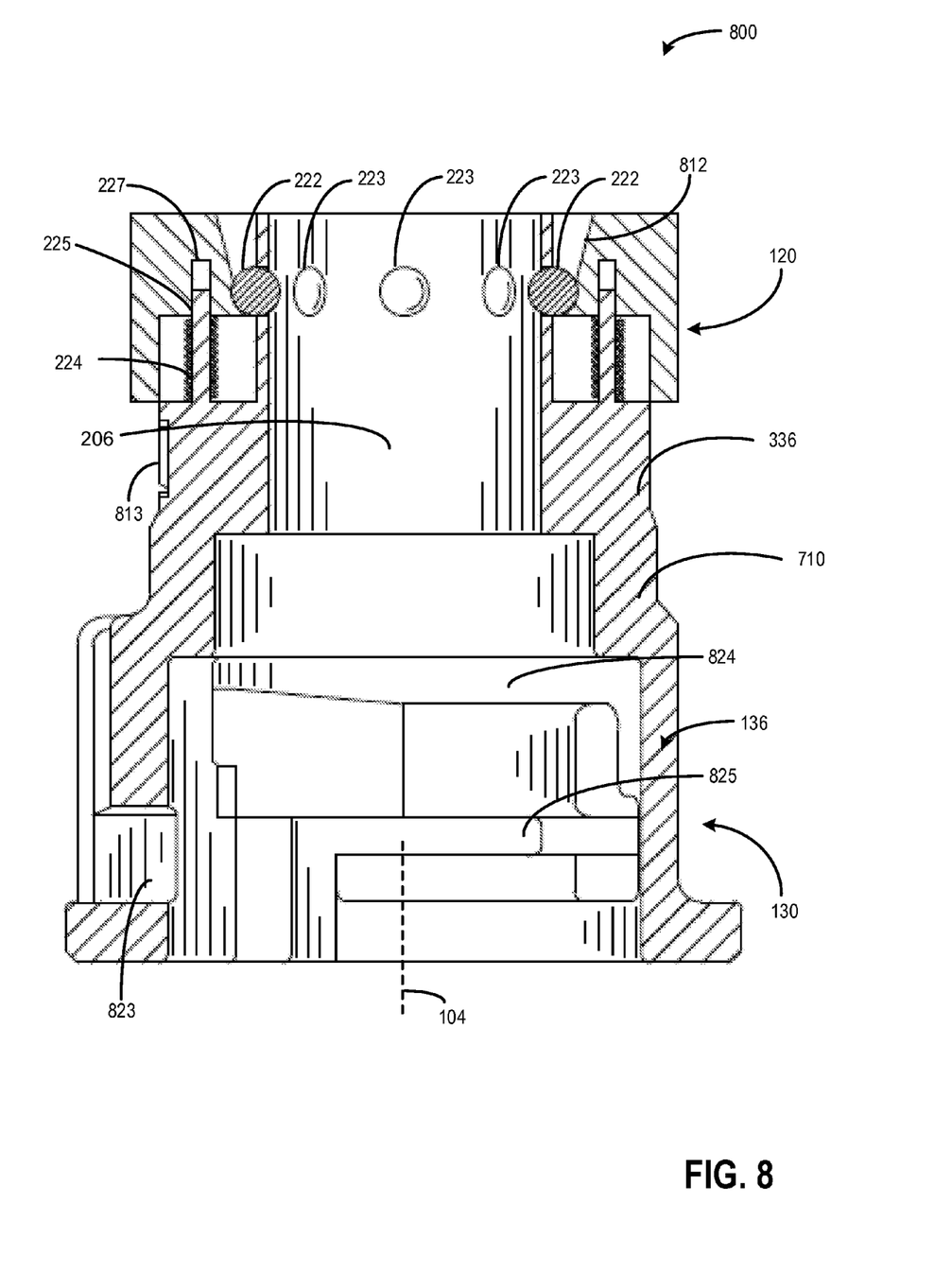
FIG. 8 is a cross-sectional view of the lower engagement part and the middle locking mechanism.

The following description relates to an example of a flexible connector system for fuel lines comprising an upper and a lower portion physically coupleable to a middle portion. A general perspective view of the complete connector assembly is shown in FIG. 1. FIG. 2 shows a cross-sectional view of the assembled connector system. In FIGS. 1 and 2, the upper, middle and lower portions of the connector are shown post assembly to form a contiguous and uninterrupted interlocked system. In FIG. 3, a dissembled view of the connector assembly is shown with the upper, middle and lower portions separated. The upper engagement part comprises a nozzle fitting as shown in FIG. 4. The nozzle fitting of the upper portion is angled relative to a central axis of the lower portion of the connector assembly. The connector system comprises a middle portion with the locking mechanism to couple the upper and the lower portions. The top and cross-sectional views of the middle portion with the locking mechanism are shown in FIGS. 5 and 6 respectively. The middle portion comprises a plurality of spherical bearings to enable rotation between the upper and lower portions. A perspective view of the lower engagement part of the connector assembly is shown in FIG. 7. The top part of the lower portion comprises a plurality of springs in direct contact with the middle portion. The lower part includes a twist-lock mechanism to connect to a fuel system component. FIG. 8 shows a cross-sectional view of the lower engagement part and the middle locking mechanism.

FIG. 1 is a schematic diagram showing a perspective view of an example of an assembled connector system 100. Such connector assemblies may be used in fuel systems to connect system components such as engines, fuel tanks, evaporative emission control canisters, etc. The connector system 100 comprises an upper portion (engagement port) 110, a middle locking portion 120 and a lower engagement port 130. In FIG. 1, all three components are shown connected to each other through the middle locking mechanism to form a contiguous and uninterrupted interlocked sealed system. The three components enclose an annular channel for the passage of fluid in the fuel system. Such connector systems may also be used in hydraulic and/or similar fluidic systems.

An axes system 106 is shown comprising of two axes, the horizontal axis and the vertical axis. A central axis 102 of the nozzle fitting 112 of the upper portion 110 is depicted by a dashed line. The lower part of the connector assembly has a central axis 104 (also depicted by a dashed line) which is parallel to the vertical axis 107. The central axis 102 of the nozzle fitting is inclined by an angle α to the central axis 104 (and the vertical axis) of the lower portion of the connector assembly. The value of α may be between 10 and 80 degrees, as an example.

The upper portion 110 comprises a nozzle fitting 112 designed with geometrical features to allow self-engagement with the mating tube of a fuel line. The nozzle fitting has a plurality of angled rings with ramps facing away from an extreme end (tip) 114 of the nozzle. The entire upper portion with the nozzle fitting 112, flange 118, elbow joint 124 and horizontal base flange 116 are molded to form a continuous system to ensure adequate sealing of the system. The central axis 102 of the nozzle fitting 112 is at an angle (90-α) to the base flange 116 at lower part of the upper portion 110. The lower part of the upper portion is parallel to the horizontal axis. An elbow joint 124 is used to couple the angular nozzle fitting 112 to the horizontal base flange 116. A detailed description of the upper portion 110 with all its components will be presented in FIG. 4.

The middle portion 120 of the connector system 100 comprises a ring-shaped housing 122 with the locking mechanism to couple the upper 110 and the lower 130 portions. The bottom surface of the middle portion 120 engages with compression springs coupled to a top of the cylindrical ring 132 of the lower portion 130. The locking mechanism of the middle portion 120 further comprises spherical bearings. The spherical bearings allow for the rotation of upper 110 and lower 130 portions of the connector system 100 with respect to one another about a single axis of rotation 104. The middle portion 120 may be manufactured from a material different from that used for the upper and lower portions. For example, middle portion 120 may be manufactured from rubber while the upper and lower portions are manufactured from iron. A detailed description of the middle portion 120 will be presented with relation to FIGS. 5 and 6.

The lower portion 130 comprises apertures rotatably housing compression springs in face sharing contact with the bottom surface of the middle portion 120. The bottom part of the lower portion 130 comprises of a twist-lock mechanism 136 for connection to a component of the fuel system. The locking mechanism 136 comprises of defined openings 134, tabs 135, and geometrical slots 137 that are designed for engagement with the external components. The components of the lower portion 130 are molded together to form one single piece. A detailed description of the lower portion 120 will be presented with relation to FIGS. 7 and 8.

FIG. 2 shows a cross-sectional view 200 of the assembled connector system 100 of FIG. 1. As such, components previously introduced are numbered similarly in subsequent figures. The connector system 100 comprises of three components namely, an upper portion 110, a middle locking portion 120 and a lower engagement port 130. In the cross-sectional view all three components are connected to each other through the middle locking mechanism to form a continuous system. The connector system 100 encloses an annular channel 206 throughout its length through which fluid may pass. An axes system 106 is shown comprising of two axes, the horizontal axis and the vertical axis.

The upper portion 110 has a nozzle fitting 112 for coupling with a fuel line. The central axis 102 of the nozzle fitting 112 makes an angle α relative to the central axis 104 of the lower portion 130. The upper portion 110 is coupled to the middle portion 120 through a locking mechanism 220. The middle portion 120 comprises a plurality of spherical bearings 222 evenly dispersed along its inner surface 221. The inner surface 221 of the middle portion 120 is angled with respect to the horizontal axis and the angle between the inner surface 221 and the horizontal axis is denoted by β. The spherical bearings 222 are rotatably housed in corresponding apertures 229 on the top region 232 of the lower portion 230. The spherical bearings allow rotation and engagement of the upper and lower portions of the connector system with respect to the middle portion, about the central axis 104.

The top region 232 of the lower portion 130 is an annular base flange 233 fitted with a plurality of evenly distributed compression springs 224. Pins 225 provide support to the compression springs 224. The compression springs 224 are coupled to the bottom surface 231 of the ring-shaped housing of the middle portion 120. There may be tubular apertures 227 in the middle portion 120 corresponding to each compression spring 224 for housing the springs. A pin 225 with a compression spring 224 do not occupy the entire length of a tubular aperture 227 and there is a gap at the end of the aperture 227. The springs 224 maintain the coupling of the lower portion 230 with the middle locking mechanism 220. The compression springs 224 hold the system together and provide improved resistance from damages caused in the fuel line connectors due to external or internal stresses, such as those during installation, service repair procedures, diurnal heating/cooling, impact from crash etc. The base flange 233 is coupled to a similar annular flange 234 bigger in diameter compared to the flange 233.

The bottom part of the lower portion 230 comprises a twist-lock mechanism 136 for engagement with a component of the fuel system. The flange 234 may be coupled to the twist-lock mechanism via an O-ring 237. Openings (recesses) and geometrical slots 240 facilitate alignment of the connector system 100 with an external system, such as components of a fuel line. A plurality of twist lock mechanism tabs may be coupled to the twist-lock mechanism for guiding and locking the external system in suitable position. In the depicted example, a pair of twist-lock mechanism tabs 236 and 238 are positioned on both sides of the twist-lock mechanism 136. The clip-like tabs 236 are disposed proximal to the middle portion 220 to facilitate attachment to the external system. Another set of rectangular tabs 238 are disposed proximal to the bottom surface of the lower part 230. The external tube (or part) to be coupled to the connector is inserted in the lower portion and locked in place by the tabs 236, 238 forming a latch system in the twist-lock mechanism 136.

FIG. 3 shows a general view 300 of the disassembled connector system 100 of the assembled connector system 100 of FIG. 1. As previously described with relation to FIGS. 1 and 2, the connector system 100 comprises of three components namely, an upper portion 110, a middle locking portion 120 and a lower engagement portion 130. In FIGS. 2 and 3 the three components of the connector assembly are coupled together though the middle locking mechanism, whereas, in FIG. 3, the components are shown separated.

The alignment of the components are shown with respect to a central axis 104. The upper portion 110 comprises a nozzle fitting 112 which is angled (a) relative to the central axis 104. An axis 102, shows the relative alignment of the nozzle fitting 112 with relation to the central axis 104. The lower part of the upper portion 110 is fitted with a fitting port 314 facilitating coupling with the middle locking mechanism. The upper portion with the nozzle fitting 112, flange 118, elbow joint 124 and fitting port 314 is molded as one continuous piece. A detailed description of design of the upper portion 110 will be presented in FIG. 4.

The middle portion 120 comprises of a ring-shaped housing with a locking mechanism that consists of spherical bearings 222 and tubular apertures for the compression springs 224. The inner part 324 of the middle portion 120 consists of a cylindrical ring 322 at the top. During assembly of the connector system, fitting port 314 is inserted in the cylindrical ring 322 for coupling of the upper 310 and the middle 320 portions. The lower inner part 326 of the middle portion 320 is positioned between the top cylindrical ring 322 and bottom ring-shaped housing 328 part of the middle portion 120. The inner part 326 has a step-like surface that is angled (δ) with respect to the central axis 102. Spherical bearings 222 are evenly distributed along the angled inner part 326 of the middle portion 120. The spherical bearings 222 allow rotation and engagement of the upper and lower portions of the connector system with respect to the middle portion about a central axis 104. Once the components are assembled, the spherical bearings 222 are rotatably housed in apertures located on the top tubular part of the port end 331 of the lower portion 130. The outer portion of the ring-shaped housing 328 encloses the inner lower part 326. There are tubular apertures on the lower part of the outer ring-shaped housing 328 for engagement with the compression springs 224.

The top part of the lower portion 130, comprises a tubular part of a port end 331 with apertures for housing the spherical bearings. Compression springs 224 are evenly distributed on an annular base flange 336 of the lower portion 130. Pins 225 are positioned on the base flange 336 to support the compression springs 224. Once the components are assembled, the compression springs 224 are housed in the tubular apertures on the lower part of the outer ring-shaped housing 328. The bottom of the lower portion 130 includes a twist-lock mechanism 136 connector to connect to a fuel system component. The twist-lock mechanism comprises a central pillar 335, defined openings 134, tabs 135, and geometrical slots 137 that are designed for engagement with external components. A detailed description of a design of the lower portion 130 will be presented in FIGS. 7 and 8.

FIG. 4 shows a perspective view 400 of an upper portion 110 of the connector assembly with nozzle fitting. The upper portion comprises two main parts, the nozzle fitting 112 on the top and the fitting port 314 on the bottom. The individual components of the upper portion, are molded together to form a sealed continuous system.

An axes system 106 is shown comprising of two axes, a horizontal axis and a vertical axis. The nozzle fitting 112, has a central axis 102 as depicted by a dashed line. The central axis 104 of the lower fitting port 314 is also denoted by a dashed line. The axis 104 is parallel to the vertical axis. The fitting nozzle 112 is angled with respect to the central axis 104 of the lower fitting port 314, a, being the angle between the two central axes. The value of a may be between 10 and 80 degrees, as an example.

The nozzle fitting 112 comprises a plurality of angled cylindrical rings and ramps facing away from an extreme end (tip) 114 of the nozzle. The tip 114 of the nozzle comprises of a chamfered cylindrical ring 402 coupled at the lower (distal from the tip) end to an extended cylindrical ring 404. The cylindrical ring 404 may have the same base diameter as ring 402, but a bigger thickness compared to the ring 402. The other end of the ring 404 is connected to a ramp facing away from the tip 114 of the nozzle. This top portion of the nozzle fitting facilitates smooth engagement with an external mating tube.

The broad part of the ramp 406 is connected to an extended cylindrical ring 408. The cylindrical rings 404 and 408 may have same diameter but different thicknesses, 404 being marginally thicker. The other end of the ring 408 is coupled to a similar cylindrical ring 412 of a marginally bigger diameter via a structural flange 410 in between. The flange 410, is of bigger diameter compared to rings 408 and 412. The flange 410 may be fitted with an O-ring to prevent back sliding and/or detachment form externally coupled parts. The cylindrical ring 412 is connected on its other end to a ramp 414 which faces away from the tip 401 of the nozzle. The ramp 414 may be of a marginally bigger thickness compared to ramp 406. The broad part of the ramp 414 is connected to a cylindrical ring 416, which is of the same diameter as the previous cylindrical ring 412 but may have marginally smaller thickness. A ramp 418, of same dimensions as ramp 414, is connected to the cylindrical ring 416. The broad part of ramp 418 is connected to a cylindrical ring 420 which forms the base for the nozzle fitting. The diameter of the ring 420 gradually expands near its base for increasing stability. The upper diameter of ring 420, may be same as that of the rings 416 and 412, however the base of ring 420 is broader and has a bigger diameter. The thickness of the ring 420 may be bigger than that of any of the preceding cylindrical rings.

The broad part of the cylindrical ring 420 is connected to a flange 118 which has a bigger diameter relative to the base of the ring 420. The plurality of components as described above constitute the fitting nozzle 112 of the upper portion 100 of the connector system. The fitting nozzle 112 is designed to allow self-engagement and easy insertion with the external mating part. The design further allows the use of external zip tie or pressurized bands around the mating tube. The design prevents back sliding and potential risks of detachment from the external part coupled to the assembly system. In addition, the nozzle fitting maintains internal pressure as required by the fuel line.

The flange 118 is connected to an elbow joint 124 via an O-ring 423. The elbow joint 124 makes an angle α (this is also the angle between the central axes of the nozzle fitting and the lower fitting port), between the flange 188 and the horizontal direction. The elbow joint 124 facilitates the angular orientation of the nozzle head with reference to the lower fitting port. The horizontal base of the elbow joint 124 is connected to a base flange 428 via an O-ring 426. The flange 428 may have a bigger diameter compared to the base of the elbow joint 124. The flange 428 shares the central axis 444 with the fitting port 314 which is parallel to the vertical direction. The other end of the flange 428 is coupled to the lower fitting port 314. The lower fitting port 314 is inserted in the middle locking portion for engagement with the middle and in turn the lower portions of the connector system. The presence of the spherical bearings in the middle locking mechanism allows for the rotation of the fitting port 314 and consequently of the entire upper portion 100 with relation to the lower portion, about an axis 104. This allows for flexibility in the fuel line connection.

The fitting port 314 comprises of a plurality of cylindrical rings and a rubber gasket seal for easy engagement with the middle portion and for prevention of any leak. The lower end of the flange 428 is coupled to a cylindrical ring 430 of a smaller diameter compared to that of the flange 428. The ring 430 is further connected to a cylindrical ring 432 which has a smaller diameter but a marginally bigger thickness compared to the ring 430. The ring 432 is connected to a cylindrical ring 434 which has a diameter greater than that of ring 432. The ring 434 may have a narrow groove in the center along its circumference. A rubber gasket 436 is positioned in the groove. The rubber gasket 436 may have a diameter marginally bigger than that of the ring 434. The rubber gasket seals the system to create insulation and prevents any leak in the system. The end (tip) 440 of the cylindrical ring 438 is chamfered for insertion into the ring-shaped housing of the middle portion to be locked in.

In this way the upper portion 100 of an assembly system for a fuel line is designed to facilitate self-engagement with an external mating tube. The angled upper nozzle fitting 112 allows easy insertion while preventing back sliding and detachment of the external part. The upper portion maintains inside pressure throughout and prevents any potential leaks.

FIG. 5 is a schematic diagram showing a top view 500 of the middle portion 120 with a locking mechanism. The locking mechanism of the middle portion 120 engages the upper and lower portions of the assembly system. The middle portion 120 comprises a ring-shaped housing manufactured from a material different from that used for the upper and lower portions. For example, middle portion 120 may be manufactured from rubber while the upper and lower portions are manufactured from iron. The ring-shaped housing encloses an annular channel 510 for engagement of the upper and lower portions. The lower fitting port of the upper portion is inserted into the annular channel 510 of the middle portion. The port end of the upper part of the lower portion couples with the middle portion 120 with the help of compression springs and spherical bearings 222. The channel 510 also provides a passage for the fluid in the fuel lines.

The middle portion 120 comprises an outer ring 502 and an inner ring 504. The bottom surface of the inner ring has four tubular apertures 227. The apertures 227 house the compression springs from the lower portion which are in direct contact with the bottom region of the middle portion 120. When the connector system is assembled the springs are compressed within the housings 227 engaging the middle and lower portions of the connector system.

A plurality of spherical bearings 222 are evenly distributed along the inner circumference of the inner ring 504 between the top and bottom surface of the housing. Eight spherical bearings 222 as shown in FIG. 5 allow for the rotation of upper and lower portions of the connector system with respect to one another about a central axis of rotation. When the three portions are being assembled, the spherical bearings 222 are in direct contact with the lower portion and are housed in apertures along the surface of the port end of the lower portion.

FIG. 6 is a schematic diagram of the cross-section 600 of the middle portion 120 showing the spherical bearings 222 and the placements of the compression springs 224. The middle portion 120 comprises the locking mechanism for coupling the upper and lower portions of the connector assembly. An axes system 106 is shown comprising of two axes, the horizontal axis and the vertical axis. The central axis 620 of the middle portion is shown by a dashed line.

The middle portion 120 is a ring-shaped housing with an annular channel enclosed in the center. The middle portion 120 comprises of two concentric cylindrical rings, an outer ring 602 and an inner ring 604 around a central axis 620. The surface of the inner ring 612 is angled with respect to the central axis 620 and the horizontal axis of the middle portion. The angle between the surface of the inner ring 612 and the horizontal axis 634 is denoted by β.

The lower surface 603 of the outer ring 602 houses tubular apertures for the compression springs 224 which are attached to the top part of the lower portion. The compression springs 224 are used to control engagement and hold the three portions of the flexible connection system together. The tubular apertures housing the compression springs 224 are evenly distributed on the outer ring 602. When the three portions are assembled, the compressed springs 224 couple the middle and lower portions and the springs are housed in the tubular apertures on the lower surface of the middle portion. Pins 225 support the compression springs 224.

A plurality of spherical bearings 222 are dispersed evenly along the angled outer circumference of the inner ring 612. When the three portions are assembled, the spherical bearings 222 are rotatable housed in apertures corresponding to their positions along the surface of the port end of the lower portion. Due to the angular nature of the circumference of the inner ring 612, the springs and the spherical bearings can operate without causing any mutual hindrance. The angular nature allows the engagement and releasing of the main parts from each other with less hassle in aligning them together and facilitates better mechanical attachments of the parts. Also, in this way corners and edges are avoided in the middle locking mechanism, which may cause damages. The spherical bearings 222 facilitate rotation of upper and lower portions of the connector system with respect to one another about a central axis 620 of rotation. Given the flexibility to rotate, stress concentration on the connector system may be avoided, hence preventing damage and leakage in the fuel line.

FIG. 7 is schematic diagram of an isometric perspective view 700 of a lower portion 130 of the connector assembly. The central axis 104 of the lower portion is shown by a dashed line. The top region 701 of the lower portion 130 comprises a port end 331 for coupling with the middle portion. The surface of the port end 331 comprises apertures for rotatably housing the spherical bearings 222, as described previously. When the connector is assembled, the ring-shaped housing of the middle part encloses the port end 331 and the spherical bearings 222 are in face sharing contact with the circumference of the port end 331. The port end 331 is mounted on a base flange 336 which has a bigger diameter in relation to the port end 331. A plurality of compression springs 224, supported by pins 225 are mounted on the top surface of the base flange 336. As discussed before, the compression springs 224 are used to couple the lower and middle portions of the connector system. On coupling with the middle locking mechanism, the compression springs 224 are housed in tubular apertures on the lower surface of the middle portion. The compression springs hold the three portions together and allow for flexibility of the system.

The base flange 336 is coupled to a flange 710 of bigger diameter via an O-ring 709. The flanges 336 and 710 form the central part of the lower portion connecting the end port 331, where the middle portion is coupled, to the lower part, which comprises a locking mechanism 136. The twist-lock mechanism 136 is disposed at the base of the lower portion 130. This locking mechanism 136 is used for coupling the connector assembly with external components of the fuel system such as with fuel lines. The locking mechanism 136 comprises of engagement supporters 724, and geometrical slots and openings 722 that are designed for engagement with the external components. The twist-lock mechanism 136 consists of plurality of engagement supporters 724 for efficiently coupling the connector system to different components of the fuel line. Further geometrical structures such as pushing pins to lock the external connector 726, alignment controller 727 are designed to facilitate alignment and coupling of external components to the connector assembly. The external tube (or part) to be coupled to the connector is inserted in the twist-lock mechanism 136 and locked in place.

FIG. 8 shows a cross-sectional view 800 of the lower portion 130 coupled to the locking mechanism of the middle portion 120. The central axis 104 of the lower portion 130 is shown by a dashed line. The middle and lower portions of the connector system encloses an annular channel 206 through which fluid may pass. As described in relation to FIGS. 5 and 6, the middle portion 120 comprises a ring-shaped housing with an outer and an inner ring. The surface of the inner ring 812 is angled relative to a central axis and the horizontal direction. The middle portion 120 comprises a plurality of spherical bearings 222 evenly dispersed along the circumference of the inner ring 812 of the middle portion. The spherical bearings 222 are rotatably housed in apertures 223 on the surface of the port end of the lower portion. The spherical bearings allow rotation and engagement of the three portions of the connector system with respect to one another about a single axis.

As seen in FIG. 7, the top port end of the lower portion comprise of a plurality of compression springs 224, supported on pins 225, mounted on a base flange 336. Ribs 813 on the side of the flange 236 provide added strength to the structures. The compression springs 224 are coupled to the bottom surface of the middle portion 120. There are definite tubular apertures 227 in the bottom surface of middle portion corresponding to each compression spring 224 for housing the springs. The springs 224 maintain the coupling of the lower portion 130 with the middle portion 120. The upper and lower portions are coupled to the middle locking mechanism with the help of the spherical bearings 222 and the compression springs 224. The spherical bearings 222 together with the compression springs 224 control the engagement of the three portions and provides rotational flexibility to the connector assembly. The central part of the lower portion 130 comprises structural flanges as shown by a flange 710 in FIG. 8.

The bottom part of the lower portion 130 comprises a twist-lock mechanism 136 for engagement with an external component. As described in relation to FIGS. 6 and 7, the tabs 823, openings and geometrical slots 825 in the twist-lock mechanism 136 facilitate alignment and coupling with an external system. The top portion of the twist-lock mechanism has a panel like structure 824, to push in and lock the system with an external system. In this way a connector system can be designed to have rotational freedom and consequently reduce risks of stress concentration at fuel line joints.

FIGS. 1-8 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example.

In this way, a flexible connector system may be designed for use in a fuel line with three components coupled together via compression springs and spherical bearings. The spherical bearings allow for increased rotatability of the upper and lower portions with respect to one another about an axis of rotation. The compression springs hold together the assembly allowing multiple degrees of freedom. Owing to the flexibility and the ability of the system to rotate about an axis, force concentration may be avoided during internal and external stresses. Therefore, localized leaks caused by the stresses may be avoided in the fuel line. The connector system is designed to be completely sealed and therefore is able to maintain inside pressure. The geometrical features allow for improved mating with external parts such as a fuel line tube, a hydraulic line tube, etc. The upper nozzle fitting and the twist-lock connector at the lower portion help couple the connector system to a fuel system component. Such flexible connectors may also be used in hydraulic systems. The technical effect of using flexible connectors in a fluid system is that adverse effect and leakages caused by internal or external stresses can be reduced significantly. As a result of the improved flexibility and increased degrees of freedom, especially degree of rotatability, such connectors may be used in a wide variety of fluid lines. In addition, such connectors may have compatibility with different vehicle designs and may be easy to service.

One example connector comprises an upper and a lower portion physically coupleable to a middle portion, the lower portion comprising a plurality of springs in direct contact with the middle portion, where the middle portion comprises a plurality of spherical bearings to enable rotation between the upper and lower portions. In the preceding example, additionally or optionally the upper portion has a nozzle fitting to connect to a fuel line, the nozzle fitting having a plurality of angled cylindrical rings with ramps facing away from an extreme end of the nozzle. In any or all of the preceding examples, the lower portion includes a twist-lock connector to connect to a fuel system component. In any or all of the preceding examples, the upper and lower portions are only rotatable with respect to one about a single axis of rotation. In any or all of the preceding examples, the middle portion additionally or optionally comprises a ring-shaped housing with a bottom surface engaging each of the springs, the housing further enclosing the spherical bearings, the bearings spaced around an inner surface of the housing, the inner surface angled with respect to a central axis of the housing and positioned between a top and bottom surface of the housing. In any or all of the preceding examples, the spherical bearings are rotatably housed on the surface of an upper port of the lower portion; and wherein a lower end port of the upper portion is additionally or optionally inserted in the inner ring of the middle portion; and wherein the spherical bearings provide rotatability of the upper portion. In any or all of the preceding examples, additionally or optionally an upper port of the lower portion is inserted in the housing ring of middle portion and wherein compression springs are engaged to connect the lower portion to the middle portion. In any or all of the preceding examples, the compression springs are housed in tubular apertures on the bottom surface of the middle portion; and wherein, the compression springs hold together the upper and lower portions at the middle portion. In any or all of the preceding examples, additionally or optionally the first, second, and third portions are coupled directly together and wherein the springs are compressed inside the tubular apertures on the bottom surface of the middle portion. In any or all of the preceding examples, spherical bearings are additionally or optionally arranged at an angle with respect to the central axis, due to the angle of the inner surface of the middle portion where the spherical bearings are dispersed, the compression springs and spherical bearings co-existing side by side. In any or all of the preceding examples, a central axis of the upper portion is angled relative to a central axis of the lower portion at an angle between 10 and 80 degrees. In any or all of the preceding examples, additionally or optionally a bottom region of the upper portion comprises a fitting end port with a plurality of flanges and circular discs arranged co-axially for coupling the upper portion to the middle portion; wherein the upper and middle portions are engaged to the lower portion via compression springs.

In any or all of the preceding examples, a rubber gasket is additionally or optionally provided in the fitting end port of the upper portion.

In another example a connector comprises an upper portion comprising protrusions located along an outer body for attaching the connector to an external system; a lower portion; and a hollow middle portion located between the upper and lower portions, the middle portion comprising spherical bearings evenly dispersed along an inner circumference of the middle portion; wherein the lower portion comprises a plurality of springs in direct contact with a bottom surface of the middle portion and a plurality of apertures rotatably housing the spherical bearings of the middle portion. In the preceding example, the spherical bearings are additionally or optionally housed in the middle portion between top and bottom surfaces of the ring-shaped housing. In any or all of the preceding examples, additionally or optionally components of the upper portion are molded together to form one continuous piece; wherein components of the lower portion are molded together to form one continuous piece; and wherein the upper and lower portions are coupled together only at the middle portion. In any or all of the preceding examples, additionally or optionally the upper portion is able to rotate with respect to the middle and lower portions about an axis due to movements of the spherical bearings in the middle housing along the surface of the upper port of the lower portion.

In yet another example a connector comprises upper, middle, and lower portions having a hollow interior leak-tight passage, wherein the upper portion comprises a fitting nozzle for coupling with a first external component; wherein the lower portion comprises a twist-lock connector for coupling with a second external component. In the preceding example, the twist-lock mechanism comprises defined openings, geometrical slots and tabs. Any or all of the preceding examples, additionally or optionally further comprises springs and spherical bearings enabling rotation of the upper relative to the lower portion while maintaining the leak-tight passage.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A connector, comprising:
   an upper and a lower portion physically coupleable to a middle portion, a top surface of the lower portion comprising a plurality of compression springs vertically mounted on a plurality of corresponding pins, the middle portion comprising a plurality of spherical bearings to enable rotation between the upper and lower portions.

2. The connector of claim 1, wherein the upper portion has a nozzle fitting to connect to a fuel line, the nozzle fitting having a plurality of angled cylindrical rings with ramps facing away from an extreme end of a nozzle.

3. The connector of claim 1, wherein the lower portion includes a twist-lock connector comprising a plurality of engagement supporters and a plurality of geometrical slots and openings to connect to a fuel system component.

4. The connector of claim 1, wherein the upper and lower portions are only rotatable with respect to one about a single axis of rotation.

5. The connector of claim 1, wherein the middle portion comprises a ring-shaped housing with a bottom surface engaging each of the compression springs, the housing further enclosing the spherical bearings, the bearings spaced around an inner surface of the housing, the inner surface angled with respect to a central axis of the housing and positioned between a top and the bottom surface of the housing.

6. The connector of claim 5, wherein the spherical bearings are rotatably housed on a surface of an upper port of the lower portion; wherein a lower end port of the upper portion is inserted in an inner ring of the middle portion; and wherein the spherical bearings provide rotatability of the upper portion.

7. The connector of claim 5, wherein an upper port of the lower portion is inserted in the housing ring of the middle portion and wherein the compression springs are engaged to connect the lower portion to the middle portion.

8. The connector of claim 7, wherein the compression springs are housed in tubular apertures on the bottom surface of the middle portion; and wherein the compression springs hold together the upper and lower portions at the middle portion.

9. The connector of claim 7, wherein the upper, middle, and lower portions are coupled directly together and wherein the compression springs are compressed inside tubular apertures on the bottom surface of the middle portion.

10. The connector of claim 5, wherein the spherical bearings are arranged at an angle with respect to the central axis, due to an angle of the inner surface of the middle portion where the spherical bearings are dispersed, the compression springs and spherical bearings co-existing side by side.

11. The connector of claim 1, wherein a central axis of the upper portion is angled relative to a central axis of the lower portion at an angle between 10 and 80 degrees.

12. The connector of claim 9, wherein a bottom region of the upper portion comprises a fitting end port with a plurality of flanges and circular discs arranged co-axially for coupling the upper portion to the middle portion; wherein the upper and middle portions are engaged to the lower portion via the compression springs.

13. The connector of claim 12, wherein a rubber gasket is provided in the fitting end port of the upper portion.

14. A connector, comprising:
   an upper portion comprising angled protrusions located along an outer body for attaching the connector to an external system;
   a lower portion; and
   a hollow middle portion located between the upper and lower portions, the middle portion comprising spherical bearings evenly dispersed along an inner circumference of the middle portion; wherein the lower portion comprises a plurality of vertically oriented compression springs mounted on corresponding pins in direct contact with corresponding tubular apertures located at a bottom surface of the middle portion and a plurality of apertures rotatably housing the spherical bearings of the middle portion.

15. The connector of claim 14, wherein the spherical bearings are housed in the middle portion between top and bottom surfaces of a ring-shaped housing.

16. The connector of claim 14, wherein components of the upper portion are molded together to form one continuous piece; wherein components of the lower portion are molded together to form one continuous piece; and wherein the upper and lower portions are coupled together only at the middle portion.

17. The connector of claim 14, where the upper portion is able to rotate with respect to the middle and lower portions about an axis due to movements of the spherical bearings in the middle housing along a surface of an upper port of the lower portion.

18. A connector, comprising:
   upper, middle, and lower portions having a hollow interior leak-tight passage, wherein the upper portion comprises a fitting nozzle including a plurality of angled cylindrical rings with ramps facing away from an extreme end of the nozzle for coupling with a first external component; wherein the lower portion comprises a twist-lock connector for coupling with a second external component and a plurality of vertically oriented compression springs mounted on pins attached to a top surface of the lower portion; and wherein the middle portion comprises a plurality of tubular apertures for housing the compression springs upon coupling of the upper, middle, and lower portions.

19. The connector of claim 18, wherein the twist-lock connector comprises defined openings, geometrical slots, and tabs.

20. The connector of claim 19, further comprising springs and spherical bearings enabling rotation of the upper portion relative to the lower portion while maintaining the leak-tight passage.

* * * * *

UNITED STATES PATENT AND TRADEMARK OFFICE
CERTIFICATE OF CORRECTION

PATENT NO. : 9,745,932 B2
APPLICATION NO. : 14/855736
DATED : August 29, 2017
INVENTOR(S) : Swadad A. Carremm et al.

Page 1 of 1

It is certified that error appears in the above-identified patent and that said Letters Patent is hereby corrected as shown below:

On the Title Page

Item (57) Abstract, Line 6, "o" should read "to".

Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*